C. F. WEEMS.
CORN GATHERER.
APPLICATION FILED FEB. 16, 1910.
1,011,537.
Patented Dec. 12, 1911.
2 SHEETS—SHEET 1.
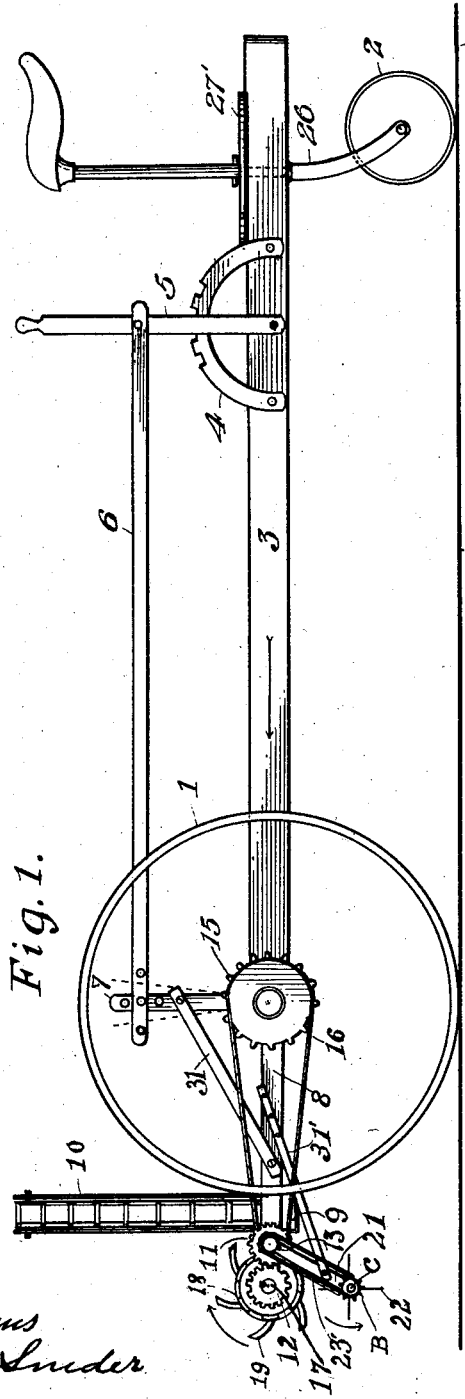
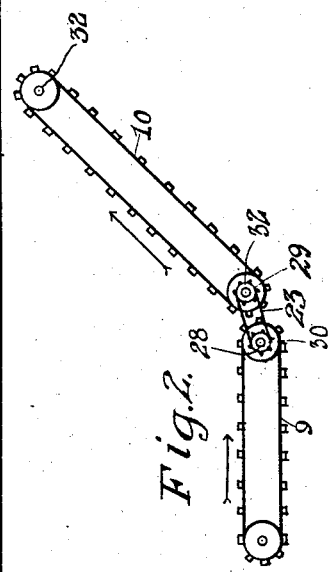

C. F. WEEMS.
CORN GATHERER.
APPLICATION FILED FEB. 16, 1910.
1,011,537.
Patented Dec. 12, 1911.
2 SHEETS—SHEET 2.
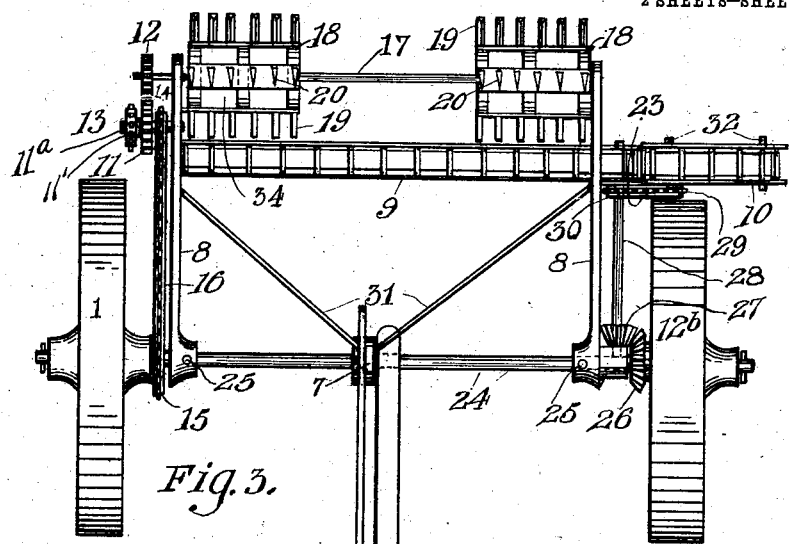
Fig. 3.
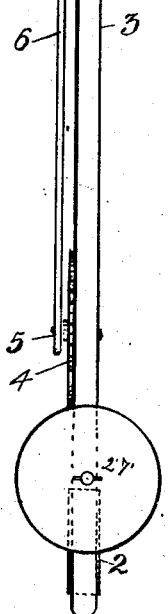

UNITED STATES PATENT OFFICE.

CHARLES F. WEEMS, OF MUTUAL, OKLAHOMA.

CORN-GATHERER.

1,011,537.  Specification of Letters Patent.  Patented Dec. 12, 1911.

Application filed February 16, 1910. Serial No. 544,322.

*To all whom it may concern:*

Be it known that I, CHARLES F. WEEMS, a citizen of the United States of America, residing at Mutual, Woodward county, and State of Oklahoma, have invented certain new and useful Improvements in Corn-Gatherers, of which the following is a specification.

This invention has relation particularly to a corn gatherer having novel means for plucking or pulling the ears of corn from the standing stalks, means being also provided for disconnecting broken stalks from the ear in order that the ears of corn may be free to pass to a conveyer.

A still further object of this invention is to provide a corn gatherer having novel means for driving the ear picking mechanism and the stalk removing mechanism in unison so that any stalks broken off in the act of removing the ear may be dislodged from the ear as stated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 is a view in side elevation of a corn gatherer embodying the invention; Fig. 2 illustrates a side elevation of the conveyer detached from the machine; and Fig. 3 illustrates a top plan view of the implement.

In these drawings 1 and 12<sup>b</sup> denote the traction wheels, 2 a caster wheel for supporting the tongue or beam 3. The tongue 3 is provided with a quadrant 4 which is designed to engage a detent carried by the lever 5 which lever has a link 6 extending forwardly to the lever 7 which lever is fastened on the axle on which the traction wheels are mounted. Two arms 8 extend forwardly from the axle and support a conveyer 9 which extends transversely of the machine, the said conveyer 9 being operatively connected to a conveyer 10 which latter conveyer extends upwardly and outwardly in order that it will carry corn to an elevated position and deposit it into the bed of a wagon or vehicle. A shaft 17 is journaled in the forward ends of the arms 8, and one or more cylinders 18 are fixed to this shaft and adapted to be rotated by suitable means operatively connected with one of the traction wheels. The means here shown for actuating the cylinders, comprises a spur gear 12 secured on the shaft 17 and meshing with the spur gear wheel 11, the latter being secured on the sleeve 11′ which is journaled on the stud 11<sup>a</sup> which is secured to one of the arms 8; the sleeve 11′ also carries sprocket wheels 13 and 14, the latter being operatively connected to a sprocket wheel 15, by means of the chain 16. The sprocket 15 is secured to the hub of the wheel 1 and is rotatable therewith about the main axle 24. Each cylinder is provided with teeth or fingers 19 which are designed to engage ears of corn on the stalks to pluck the said ears from the stalks. Owing to the motion that is communicated to the shaft 17 through the medium of the sprocket wheels and chains just described the cylinders are rotated and ears of corn, plucked from the stalk by the fingers, are carried rearwardly into the conveyer 9 and from thence to the conveyer 10 since they are connected together through the medium of a chain 23. The conveyers are driven through the medium of a beveled gear wheel 26 which is carried by the hub of the wheel 12<sup>b</sup>, the wheel 26 being in mesh with the wheel 27 on the shaft 28 and the shaft 28 in turn having a sprocket wheel 30 thereon which engages the chain 23. The chain 23 runs over the sprocket wheel 29 on one of the shafts 32, two of said shafts being shown associated with the conveyer 10, the said shafts 32 being the shafts of drums over which the conveyer belts operate. Links 31 connect the lever 7 with the arms 8 and as the lever 7 is oscillated, the forward ends of the arms are raised or lowered. The hand lever 5 is pivoted to the tongue 3 and adapted for adjustment by means of a quadrant 4; and a link 6 is pivotally connected to levers 5 and 7, and by means of this link and the hand lever 5, the lever 7 and arms 8 may be oscillated and adjusted. The arms 8 are secured to the axle 24 by means of pins 25, and the lever 7 is secured on the hub 7′ which is secured on the axle 24. The beam is provided with a platform 27′ to accommodate the feet of an operator or driver and a suitable seat may be provided as indicated. Any proper means may be provided for hitching horses to the implement for the purpose of propelling it with the cylinders traveling toward the stalks from which the ears of corn are to be removed; but such means, being no part of the present invention, is not shown or described.

For the purpose of removing pieces of stalk that may be broken from the main stalk while the ears are being removed, beaters are stationed under the cylinder and said beaters are operated or rotated so that they will strike the broken stalk and dislodge it from the ear thus permitting the ear to be carried back to the elevator free of the stalk that was previously broken from the main stalk. In carrying out this feature of the invention a sprocket chain 23′ is applied to the sprocket wheel 13, and the said sprocket chain is engaged by a sprocket wheel B on the shaft C. The shaft C is journaled in a frame comprising arms, only one of which is visible in the drawings, designated by the numeral 21. These arms are braced by means of bars 31′, connected thereto and to the arms 8. The beaters are in such relation to the cylinders as to strike pieces of stalk that have been removed from the main stalk and owing to the fact that the said beaters are rotated at a relatively high rate of speed, the impact of the beaters with the piece of stalk will serve to cut it or break it away from the ear.

I claim—

1. In a corn gatherer, traction wheels, an axle therefor, means for partially rotating the axle, forwardly extending arms mounted on the axle and taking motion therefrom, a shaft journaled in the outer ends of the arms, toothed cylinders mounted on the shaft, means for rotating the said shaft, beaters operatively mounted under the cylinders for dislodging stalks from the cylinders, and means for actuating the beaters.

2. In a corn gathering machine, an axle, traction wheels mounted thereon, forwardly extending arms extending from the axle, means for oscillating the said arms, a shaft journaled in the arms, toothed cylinders on the shaft, means for rotating the shaft, a substantially horizontal conveyer rearward of the toothed cylinder for receiving the ears of corn from said cylinder, a beater in operative relation to the cylinders for dislodging broken stalks from the ears of corn carried by the cylinder, and means for operating the beaters.

3. In a corn gatherer, traction wheels, a main axle on which the traction wheels are mounted, a tongue, forwardly extending arms carried by the main axle and adapted to receive oscillatory motion with relation to the tongue, means for oscillating the arms, a rotatable shaft carried by the arms, a toothed cylinder carried by the shaft, transmission means connected with one of the traction wheels for driving the shaft, beaters located under said toothed cylinder and connected in operative relation therewith, a beater shaft on which the beaters are mounted, and means for rotating the beater shaft and beaters.

In testimony whereof I affix my signature in presence of two witnesses.

CHARLES F. WEEMS.

Witnesses:
 Thos. D. Weems,
 Weems V. Snider.